(12) United States Patent
Syed et al.

(10) Patent No.: US 9,602,494 B2
(45) Date of Patent: Mar. 21, 2017

(54) THIRD PARTY PAYWALL AUTHENTICATION SYSTEM

(71) Applicant: Apple Inc., Cupertino, CA (US)

(72) Inventors: Farman A. Syed, San Jose, CA (US); Ian J. Elseth, Vancouver, WA (US); Martin J. Murrett, San Francisco, CA (US); Michelle H. Gonzalez, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/723,143

(22) Filed: May 27, 2015

(65) Prior Publication Data

US 2016/0352714 A1 Dec. 1, 2016

(51) Int. Cl.
*H04L 29/06* (2006.01)
*H04L 29/08* (2006.01)

(52) U.S. Cl.
CPC ............ *H04L 63/08* (2013.01); *H04L 63/102* (2013.01); *H04L 67/306* (2013.01)

(58) Field of Classification Search
CPC ..................................................... H04L 63/08
USPC ............................................................ 726/4
See application file for complete search history.

(56) References Cited

U.S. PATENT DOCUMENTS

| 6,332,124 | B1 | 12/2001 | Loeb et al. |
| 8,606,684 | B2 | 12/2013 | Bi et al. |
| 8,671,274 | B2 * | 3/2014 | Ross ..................... H04L 9/3213 713/156 |
| 8,707,403 | B2 | 4/2014 | Malat et al. |
| 2013/0085945 | A1 | 4/2013 | Schultz |

FOREIGN PATENT DOCUMENTS

| WO | WO 2011-156778 | * 12/2011 |
| WO | WO 2011/156778 | 12/2011 |

* cited by examiner

*Primary Examiner* — Longbit Chai
(74) *Attorney, Agent, or Firm* — Polsinelli LLP

(57) ABSTRACT

The present technology provides a less burdensome mechanism to bring media items owned or licensed in the physical world into an account hosted by an electronic media provider. A specific use case deals with magazine subscriptions wherein the electronic media provider can send entity identifying information to a publisher clearinghouse that has subscription data for many different magazines. If the entity information sufficiently matches subscription information, the clearinghouse sends back data identifying magazines for which the entity is entitled to a digital copy, and these magazines become available to the user through the electronic media provider.

14 Claims, 9 Drawing Sheets

THIRD PARTY PAYWALL AUTHENTICATION SYSTEM

BACKGROUND

1. Technical Field

The present disclosure relates to digital media items and more specifically to automatically providing access to digital versions of non-digital media subscribed to by a user.

2. Introduction

Many users have existing subscriptions to non-digital media such as publications including magazines, newspapers, movies, music, etc. and desire the ability to view these publications in digital format using a handheld device or computer system. Oftentimes, a publisher will require a user to visit the publisher's website to authenticate their subscription with the non-digital media to access the content in digital version that they have already paid for in non-digital media. The authentication process may prove burdensome and time consuming as it often requires the user to enter several pieces of authenticating information at the publisher website including the user's name, telephone number, address, date of birth, last few digits of the non-digital media barcode, credit card used to purchase the non-digital media, etc. If the user subscribes to several non-digital media, the user may be unmotivated to access digital versions of non-digital media they already subscribe to due to the amount of time required for the authentication process.

Media distribution platforms offer digital versions of publications from publishers that also offer printed versions of the publication. To avoid authenticating subscriptions individually for all the publishers the user is subscribed to, some users prefer to purchase digital subscriptions from publishers on a media distribution platform. However, in some cases, a user can be charged a second time when the user purchasing digital versions of the publications already subscribes to the same publisher in non-digital media.

Accordingly, there is a need for systems, methods, and computer readable media that allow users to automatically access digital versions of non-digital media they subscribe to with minimal effort without double charging for the digital versions.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for automatically providing access to digital versions of non-digital media subscribed to by a user. Some embodiments of the present technology involve receiving subscription data from publishers, the subscription data relating to multiple third-party subscribers. In some embodiments third-party subscribers are matched with users of a media distribution platform which grants those users with a digital subscription to their content.

In some embodiments a media distribution platform will attempt to automatically authenticate a user's subscriptions to publications by accessing subscription data available from publishers and performing a data match between the subscription data and media distribution platform user profile data. Upon completion of a successful data match between the subscription data and user profile data, a user can be provided with digital access to all the content they subscribe to in printed form on a media distribution platform. The media distribution platform can utilize a universal reader to display and view multiple publications from various publishers.

In some cases publishers might not agree to provide a media distribution platform with subscription data. In this scenario, a media distribution platform can automatically request a user's identification information from a user profile database, thus requiring no input from a user. The identification information can in turn be sent to a publisher and, if the publisher recognizes it, provide the user with an access token for a given subscription. In some embodiments, the access token for a given subscription will be included whenever the user receives digital content relating to the subscription from the publisher. This enables the publisher to refuse the access token whenever the subscription is expired or cancelled. Once access to the digital version of the publication is granted, the media distribution platform can utilize a universal reader to display and view multiple publications from various publishers.

According to some embodiments there are some situations where automatically authenticating a user's subscription to publications might fail. In this scenario, a media distribution platform can present a user interface within the media distribution platform containing fields a publisher has requested for a user to populate to verify a user's subscription to publications. The user's input can be sent to the publisher and, if the publisher recognizes it, the publisher can provide an access token for a given subscription. Once access to the digital version of the publication is granted, the media distribution platform can utilize a universal reader to display and view multiple publications from various publishers.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
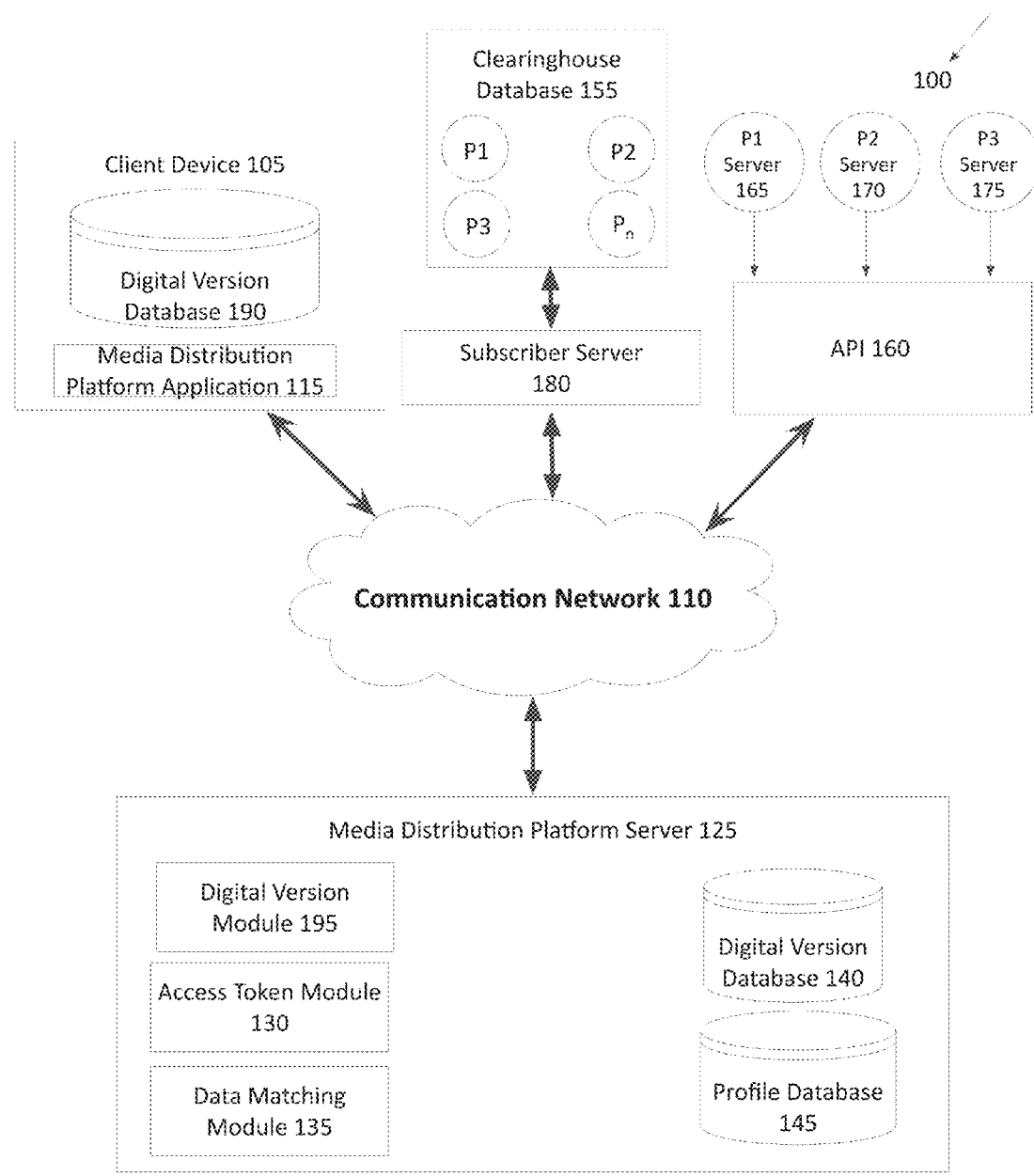
FIG. 1 illustrates a general purpose computing environment in which multiple computing devices can be configured to communicate with each other to automatically provide access to digital versions of non-digital media subscribed to by a user.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

As explained above, there is a need for systems, methods, and computer readable media that allow users to automatically access digital versions of non-digital media they subscribe to with minimal effort without double charging for the digital versions. Some embodiments of the present technology involve receiving subscription data from publishers, the subscription data relating to multiple third-party subscribers. In some embodiments third-party subscribers are matched with users of a media distribution platform which grants those users with a digital subscription to their content.

In some embodiments, a media distribution platform will attempt to automatically authenticate a user's subscriptions to publications by accessing subscription data available from publishers and performing a data match between the subscription data and media distribution platform user profile data. Upon completion of a successful data match between the subscription data and user profile data, a user can be provided with digital access to all the content they subscribe to in printed form on a media distribution platform. The media distribution platform can utilize a universal reader to display and view multiple publications from various publishers.

In some cases publishers might not agree to provide a media distribution platform with subscription data. In this scenario, a media distribution platform can automatically request a user's identification information from a user profile database requiring no input from a user. The identification information can in turn be sent to a publisher and, if the publisher recognizes it, the publisher will provide the user with an access token for a given subscription. In some embodiments, the access token for a given subscription will be included whenever the user receives digital, media relating to the subscription from the publisher. This enables the publisher to refuse the access token if the subscription has expired or is cancelled. Once access to the digital version of the publication is granted, the media distribution platform can utilize a universal reader to display and view multiple publications from various publishers.

According to some embodiments there are some situations where automatically authenticating a user's subscription to publications might fail. In this scenario, a media distribution platform can present a user interface within the media distribution platform containing fields a publisher has requested for a user to populate to verify a user's subscription to publications. The users input can be sent to the publisher and, if the publisher recognizes it, the publisher can provide an access token for a given subscription. This access token can be included with digital content relating to the subscription from the publisher that is sent to the user. This enables the publisher to refuse the access token whenever the subscription has expired or is cancelled. Once access to the digital version of the publication is granted, the media distribution platform can utilize a universal reader to display and view multiple publications from various publishers.

FIG. 1 illustrates a system configuration 100 in which multiple computing devices can be configured to authenticate a user's subscription to non-digital media and provide access to digital versions of the non-digital media in a media distribution platform 115 on a client device 105. Although one client device 105 is depicted, it should be understood that multiple client devices can be associated with a particular user. Some non-limiting examples of non-digital media can include periodicals such as magazines, newspapers, brochures, etc. In some embodiments, other physical media can be a "non-digital media," e.g., CDs, DVDs, Blu-Ray disc, etc. An example of a media distribution platform 115 is ITUNES, available from Apple Inc. of Cupertino, Calif. The media distribution platform can be configured to store, sell, rent, stream any type of digital media product such as music, movies, television shows, user-generated videos, digital books, podcasts, applications, magazines, newspapers, periodicals, photos, artwork, etc.

According to some embodiments, the current technology can be configured to authenticate a user's subscription to digital publications offered on a publisher's website and provide access to the digital publications in a media distribution platform 115 on a client device 105. Providing access to the user's subscription to digital publications offered on multiple publishers' websites allows for efficient access to the user's digital publications on one common platform. This eliminates the need for the user to log into multiple publishers' websites in order to access digital subscription content from a plurality of publishers.

In some embodiments, a media distribution platform can make multiple publications offered by multiple publishers available for viewing using a universal reader. In some cases, publications accessed directly from a publisher's website can require a reader specific to that website to view the publication. Requiring a user to visit each publisher's independent website to view the publications offered by that publisher can prove time consuming and burdensome. By contrast, the media distribution platform having the capability to provide a plurality of publications from a plurality of publishers in one location using one universal reader allows a user to view publications they subscribe to with ease.

According to some embodiments, a user can authenticate their subscriptions to non-digital media by providing one input into a media distribution platform, i.e., a click of a mouse, an input on a touch screen of a graphical user interface of a mobile device, or one input into a media distribution platform, etc. In some embodiments, upon signing into a new product a user can be presented with a series of greetings such as "Welcome to the new product!," "Do you have any existing print subscriptions that you would like to receive a digital version of?," "Sign in with your ID and perform a check." Upon successful verification of the user's subscription to the non-digital media, the product can present to the user a success dialog such as "You have access to Newsweek, Time and Sports Illustrated."

Authenticating a user's subscription to non-digital media with one click of a mouse, one input on a touch screen of a graphical user interface of a mobile device, or one input into a media distribution platform can occur under multiple conditions. In some embodiments, a clearinghouse database 155 possesses a large majority of subscribers to a plurality of publishers P1, P2, P3, ... $P_n$. A Subscriber Server 180 can access the clearinghouse database 155 to retrieve subscription data associated with a plurality of publishers P1, P2, P3, ... $P_n$. In other embodiments publishers have access to an application program interface (API) 160 for a Subscriber Server 180. Using API 160, the publishers can submit subscription data to the Subscriber Server 1 180. For instance P1 Server 165 (Publisher 1), P2 Server 170 (Publisher 2), and P3 Server 175 (Publisher 3) can utilize API 160 and communication network 110 to feed the Subscriber Server 180 with their subscription data. In some instances, the API can receive subscription data directly from clearinghouse database 155. In some embodiments the Subscriber Server 180 is separate from the media distribution platform server 125. In other embodiments, Subscriber Server 180 is contained within the Media Distribution Platform Server.

Providing the Subscriber Server 180 with subscription data from the clearinghouse database 155 or from API 160, which can receive subscription data directly from publishers, enables the Subscriber Server 180 to match third-party subscribers to media distribution platform users and automatically grant those users with a digital subscription to their content. Media distribution platform server 125 can consist of a user profile database 145 which contains the media distribution platform user profile data. Data matching module 135 matches third-party subscribers provided in the subscription data to media distribution platform users. Some non-limiting examples of data that the data matching module 135 utilizes to perform the data match includes a user's name, maiden name, home addresses, business addresses, mailing addresses, email addresses, date of birth, etc.

Digital version database 140 can contain digital versions of non-digital media from a plurality of publishers. Digital version database 140 can provide digital versions of non-digital media a user subscribes to upon successful completion of a data match. In some embodiments, a user can access the digital versions automatically granted to the user on a client device 105 utilizing a client application of the media distribution platform.

Enabling the Subscriber Server 180 to authenticate a user's subscription to their printed content and automatically grant users with a digital subscription is the ideal scenario because it requires no input from the user. The user simply has access to all their content on first launch of the product.

According to some embodiments, there are some situations where automatically authenticating a user's subscription to publications might fail. In this scenario, a media distribution platform can present a user interface within the media distribution platform containing fields corresponding to the subscription data available on the media distribution platform server. The users input can be matched against the subscription data and, if successful, provide digital access to the non-digital media subscribed to by the user. Once access to the digital version of the publication is granted, the media distribution platform can utilize a universal reader to display and view multiple publications from various publishers.

However, in some instances a publisher might be unwilling to provide their subscription data to the clearinghouse database 155, the API 160, or the Subscriber Server 180. Under these circumstances a user's subscription to non-digital media must be authenticated utilizing an alternate approach. When a user claims to be an existing subscriber of a non-digital media from a publisher, the media distribution platform server will start by trying to validate their subscription data behind the scenes without requiring any input by the user. In some embodiments, a client application will request the user's billing address from the media distribution platform server 125 and send it to the publisher. If the publisher recognizes it, the publisher will in turn provide the client with an access token. Access token module 130 can store the access token for a given subscription associated with a user. In some embodiments, the access token for a given subscription will be included whenever the user receives digital content relating to the subscription from the publisher. This enables the publisher to refuse the access token whenever the subscription is expired or cancelled. Once access to the digital version of the publication is granted, the media distribution platform can utilize a universal reader to display and view multiple publications from various publishers.

Although the access token module 130 is illustrated as a part of the media distribution platform server 125, this is just one possible embodiment and is not meant to be limiting. For example, the access token module can be contained within the client device 105.

According to some embodiments there are some situations where automatically authenticating a user's subscription to publications might fail. In this scenario, a media distribution platform can present a user interface within the media distribution platform containing fields a publisher has requested for a user to populate to verify a user's subscription to publications. The user's input can be sent to the publisher, and if the publisher recognizes it, the publisher can provide an access token for a given subscription. The access token can be included whenever the user receives digital content relating to the subscription from the publisher. This enables the publisher to refuse the access token if the subscription has expired or is cancelled. Once access to the digital version of the publication is granted, the media distribution platform can utilize a universal reader to display and view multiple publications from various publishers.

To facilitate authenticating a user's subscription to non-digital media and automatically granting those users with a digital subscription to their content, multiple computing devices can be connected to a communication network 110 and configured to communicate with each other through use of the communication network 110. The communication network 110 can be any type of network, including a local area network ("LAN"), such as an intranet, a wide area network ("WAN"), such as the internet, or any combination thereof. Further, the communication network 110 can be a public network, a private network, or a combination thereof. The communication network 110 can also be implemented using any type or types of physical media, including wired communication paths and wireless communication paths associated with one or more service providers. Additionally, the communication network 110 can be configured to support the transmission of messages formatted using a variety of protocols.

A computing device can be any type of general computing device capable of network communication with other computing devices. For example, the computing device can be a personal computing device such as a desktop or workstation, a business server, or a portable computing device, such as a laptop, smart phone, or tablet personal computer. The computing device can include some or all of the features, components, and peripherals of computing device 900 of FIG. 9A.

To facilitate communication with other computing devices, the computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As illustrated, a client device 105 can be configured to communicate with a media distribution platform server 125 to provide a media distribution platform on the client device 105. For example, a media distribution platform application 115 running on the client device 105 can be configured to communicate with a digital version module 195 on the media distribution platform server 125 to request, receive and perform digital versions of non-digital media a user subscribes to granted to the user.

Although the digital version database 140 and user profile database 145 are illustrated separately, this is just one possible embodiment and is not meant to be limiting. In some embodiments, the databases can be combined as one database or any other possible combination.

Alternatively, in some embodiments, the multiple databases can be hosted on separate computing devices and the digital version module 195 can be configured to communicate with the various computing devices to provide the digital versions to a user.

In some embodiments, the digital version module 195 can be configured to transmit the digital versions granted to a user to the client device 105 where the digital versions can be presented by the media distribution platform application 115. For example, the media distribution platform server 125 can be in continuous communication with the media distribution platform application 115 to transmit the digital versions subscribed to by a user to the media distribution platform application 115.

In some embodiments, the media distribution server 125 can be configured to transmit the digital versions subscribed to by a user to the client device 105 in segments. For example, the digital version module 195 can be configured to communicate with the client device to transmit the most current digital versions subscribed to by a user which can be stored on the client device 105 and presented by the media distribution platform application 115. For example, the client device 105 can include a digital version database 190 configured to store the received digital versions of non-digital media from a plurality of publishers and the media distribution platform application 115 can be configured to communicate with the digital version database 190 to retrieve the stored digital versions. In this type embodiment, the digital version module 195 can be configured to periodically update the client device 105 by transmitting digital versions subscribed to by a user.

In some embodiments, the digital versions of non-digital media subscribed to by a user can be assembled at the client device 105 rather than at the media distribution platform server 125. For example, the digital version module 195 can be running on the client device 105 and can be configured to request digital versions of non-digital media subscribed to by a user from the media distribution platform server 125, or any other computing device. The received digital versions of non-digital media subscribed to by a user can be stored in the digital version database 190 and the digital version module 195 can be configured to communicate with the digital version database 190 to retrieve the stored digital versions and to assemble the digital versions for viewing. In this type of embodiment, the media distribution application 115 running on the client device 105 can be configured to periodically request further digital versions to be delivered to the client device.

The digital version module 195 can be configured to assemble the digital versions based upon digital version assembly rules. The digital version assembly rules can dictate which digital versions should be selected as well as the sequential order in which they should be presented by the media player application 115.

Figure 2:
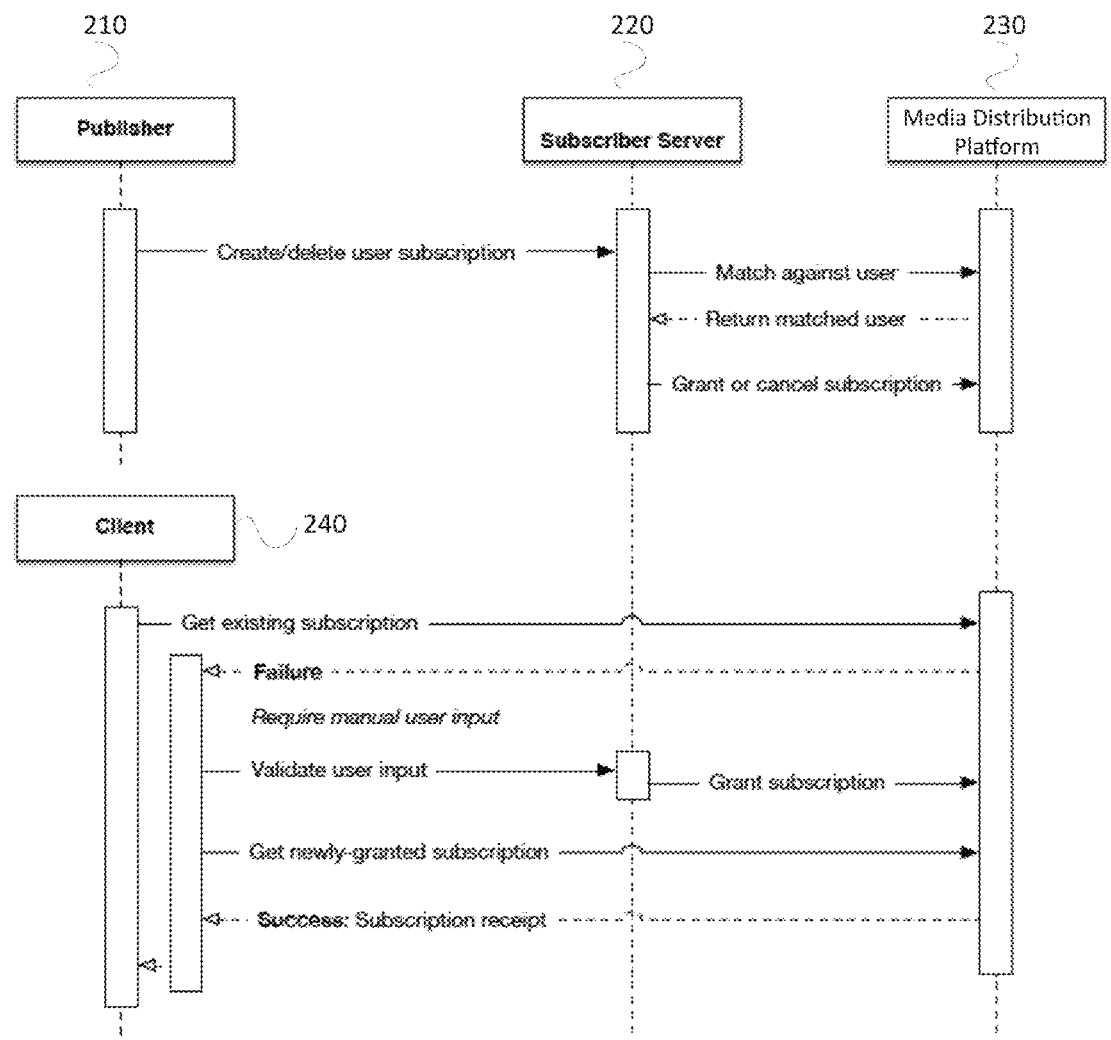
FIG. 2 illustrates a method of automatically authenticating a user's subscription to non-digital media where publishers have shared their subscription data with a media distribution platform.

FIG. 2 illustrates a method of automatically authenticating a user's subscription to non-digital media where publishers have shared their subscription data with a media distribution platform. In some instances, publishers are willing to share their subscription data with a media distribution platform which allows the media distribution platform to authenticate a user's subscriptions by performing a data match.

The method begins by Publisher 210 sending a request to Subscriber Server 220 to either create a new user subscription or delete an existing user subscription. In some embodiments, the request contains third-party subscriber subscription data. Some non-limiting examples of subscription data are the subscriber's name, maiden name, home addresses, business addresses, mailing addresses, email addresses, date of birth, etc. The Subscriber Server 220 can in turn send a request to Media Distribution Platform 230 to match the subscription data pertaining to the third-party subscriber against identification information of a user of the Media Distribution Platform. Upon completion of a successful match between the third-party subscriber and a user of the Media Distribution Platform, Media Distribution Platform 230 returns the matched user to the Subscriber Server 220. Returning a matched user allows the Subscriber Server 220 to send a request to Media Distribution Platform 230 to grant a subscription to the publication subscribed to from Publisher 210. In some embodiments, granting a subscription to the publication can ultimately cause Media Distribution Platform to unlock publication content currently stored in the Media Distribution Platform for a given publisher and provide a user with access to the unlocked content. In some cases, despite the fact that a matched user was identified, the matched user's subscription to Publisher 210's publication may have expired. In this scenario, the Subscriber Server 220 can send a request to the Media Distribution Platform to cancel a user's subscription to Publisher 210 publication. Provided that a subscription was granted to Publisher 210's publication, the method continues to Client 240 requesting the existing subscription materials from the Media Distribution Platform 230.

In some embodiments, although a user may indeed be a current subscriber to Publisher 210 publication, there are some situations in which authenticating a user's subscription might fail, thus causing Media Distribution Platform 230 to send a failure message to Client 240. Some non-limiting examples of scenarios in which authentication might fail for a subscriber include: the user has multiple billing addresses and did not use the same address with Media Distribution Platform 230 that they used with the Publisher 210; there are multiple subscribers at a single address; the user is not a subscriber; the publisher has poor address recognition; etc. In these failure cases additional information might be manually required from a user to authenticate a user's subscription. In some embodiments, a user interface will appear on Client 240 requesting fields a user needs to populate to authenticate the user's subscription to publications. The user input received at Client 240 can be sent to Subscriber Server 220 to validate the user input. Upon successful validation, Subscriber Server 220 can grant a subscription to Publisher 210's publication. Client 240 can subsequently receive any newly-granted subscription from Media Distribution Platform and a subscription receipt can be sent from Media Distribution Platform 230 to Client 240. In some embodiments, the subscription receipt received by Client 240 is accompanied by subscription publication materials unlocked in Media Distribution Platform from Publisher 210 now available for the user in digital format.

In some embodiments, a user can log into the media distribution platform server by inputting their username or password into a user interface provided on the media distribution platform. In some embodiments the username and password can be an ID. In some embodiments, upon a user logging into the media distribution platform, the media distribution platform refreshes to identify new subscriptions available for download which are subscribed to by a user. If any new subscriptions available for download are identified, these subscriptions are included in the subscriptions that are unlocked and provided to the media distribution platform server.

Figure 3:
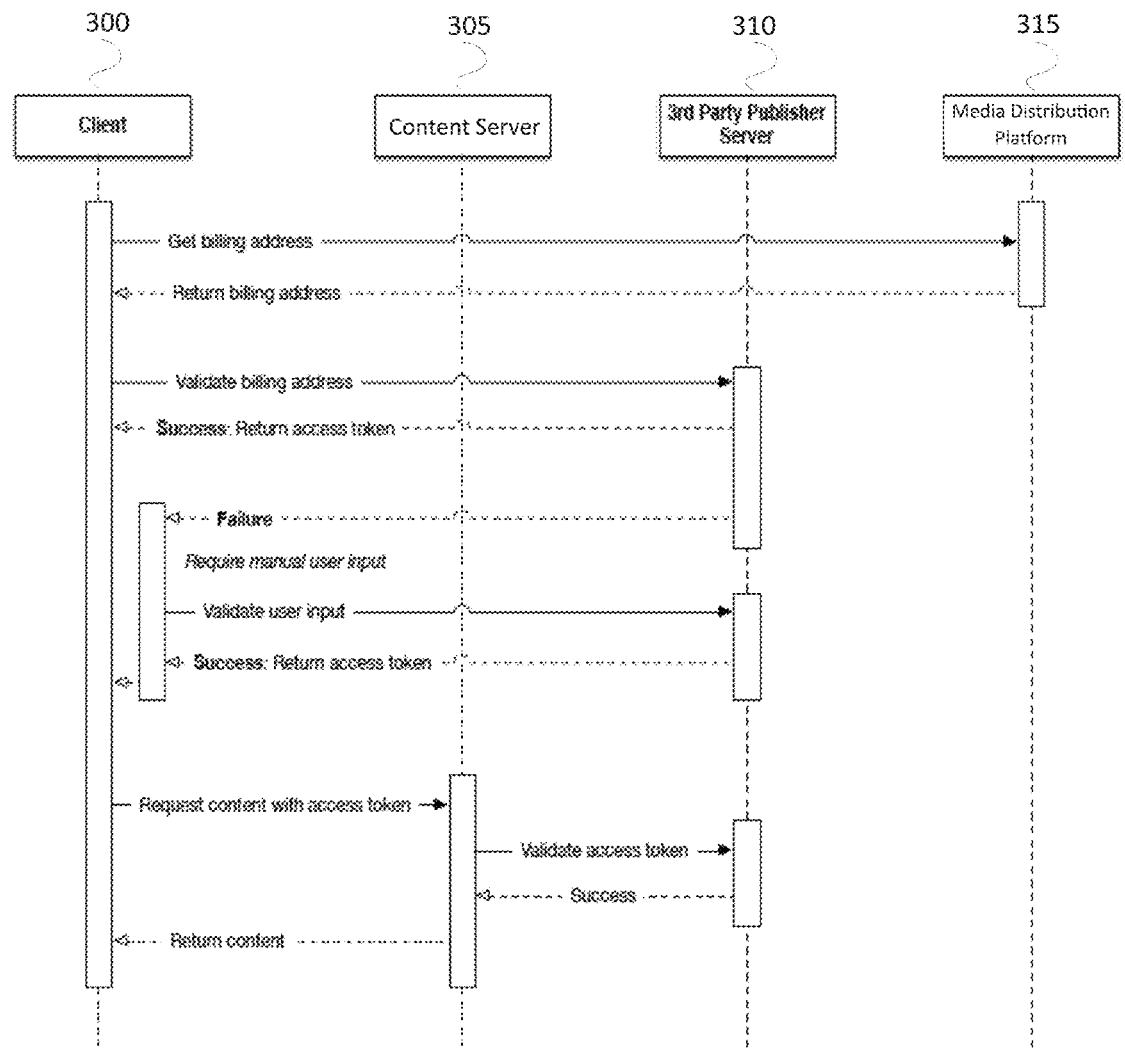
FIG. 3 illustrates a method of automatically authenticating a user's subscription to non-digital media where publishers subscription data is private.

FIG. 3 illustrates a method of automatically authenticating a user's subscription to non-digital media where publishers have not shared their subscription data with a media distribution platform. In some cases, publishers are unwilling to provide their subscription data to the media distribution platform. In this scenario, authenticating a user's subscriptions to publications occurs by authenticating a user's subscriptions directly with Publishers.

The method begins with Client 300 requesting a user's identification information from Media Distribution Platform 315. Some non-limiting examples of identification information are the subscriber's name, maiden name, home addresses, business addresses, mailing addresses, email addresses, date of birth, etc. As a non-limiting example, in FIG. 3 Client 300 has requested a user's billing address from Media Distribution Platform 315. The method continues to Media Distribution Platform 315 returning the billing address to the Client 300. Upon receipt the Client 300 can send the billing address to Third-Party Publisher Server 310 to validate the billing address and authenticate the user's subscriptions to publications from the Third-Party Publisher Server 310.

The method continues to Third-Party Publisher Server 310 returning an access token for each subscription authenticated from the Third-Party Publisher. In some embodiments, one access token is provided to a user for each subscription authenticated from the Third-Party Publisher. For example, if five publications are authenticated from Third-Party Publisher Server 310, five access tokens are provided to the Client 300. In other embodiments, one universal access token is provided to a user for all the subscriptions authenticated from Third-Party Publisher server 310. For example, if five publications are authenticated from Third-Party Publisher Server 310, one universal access token is provided to the Client 300.

In some instances, despite the fact that a user subscribes to one or more publications from Third-Party Publisher Server 310, the process of authenticating the user's subscriptions might fail. Some non-limiting examples of scenarios in which authentication might fail for a subscriber include: The user has multiple billing addresses and did not use the same address with Media Distribution Platform 230 that they used with the Publisher 210; there are multiple subscribers at a single address; the user is not a subscriber; the publisher has poor address recognition; etc. In these failure cases additional information can be manually required from a user to authenticate a user's subscription. In some embodiments, a user interface will appear on Client 300 requesting fields a user needs to populate to authenticate the user's subscription to publications. The user input received at Client 240 can be sent to Third-Party Publisher Server 310 to validate the user input. Upon successful validation, Third-Party Publisher Server 310 returns an access token to Client 300. In some embodiments, one access token is provided to a user for each subscription authenticated from the Publisher. For example, if five publications are authenticated from Third-Party Publisher Server 310, five access tokens are provided to the Client 300. In other embodiments, one universal access token is provided to a user for all the subscriptions authenticated from Third-Party Publisher server 310. For example, if five publications are authenticated from Third-Party Publisher Server 310, one universal access token is provided to the Client 300.

The method continues with the Client 300 requesting content with the access token from the Content Server 305. In some embodiments, Client 300 sends the access token to the Content server along with a request for content. In some embodiments, the access token for a given subscription will be included with a request for content relating to a subscription from the publisher. This enables the Third-Party Publisher Server 310 to refuse the access token whenever the subscription is expired or cancelled.

Upon receiving the access token, Content Server 305 sends the access token to Third-Party Publisher Server 310 to validate the access token. Third-Party Publisher Server 310 validates the access token by determining that a user's subscription associated with the access token has not expired or cancelled. Upon successful validation of the access token, Third-Party Publisher Server 310 sends the validated access token to the Content Server 305 which in turn allows the Content Server 305 to return content associated with the access token to Client 300.

In some embodiments, Third-Party Publisher Server contains the content requested by Client 300. Upon validation of the access token, Third-Party Publisher Server 310 returns the validated access token with subscription content associated with the access token to the Content Server 305. In other embodiments, Third-Party Publisher Server 310 validates the access token and returns the validated access token to Content Server 305 which. Upon receipt of the access token, content stored on the Content Server 305 is unlocked for distribution to the Client 300. Yet in another embodiment, Third-Party Publisher Server 310 validates the access token and returns the validated access token to Content Server 305. Content associated with access token is stored in Media Distribution Platform 315. Upon receipt of the validated access token, Content Server 305 sends a request to Media Distribution Platform 315 to unlock the content associated with the validated access token. Media Distribution Platform 315 in turn sends the requested content to Client 300.

In some embodiments, a user can log into the media distribution platform server by inputting their username or password into a user interface provided on the media distribution platform. In some embodiments the username and password can be an ID. In some embodiments upon a user logging into the media distribution platform, the media distribution platform refreshes to identify new subscriptions available for download subscribed to by a user. If any new subscriptions available for download are identified, these subscriptions are included in the subscriptions that are unlocked and provided to the media distribution platform server.

Figure 4:
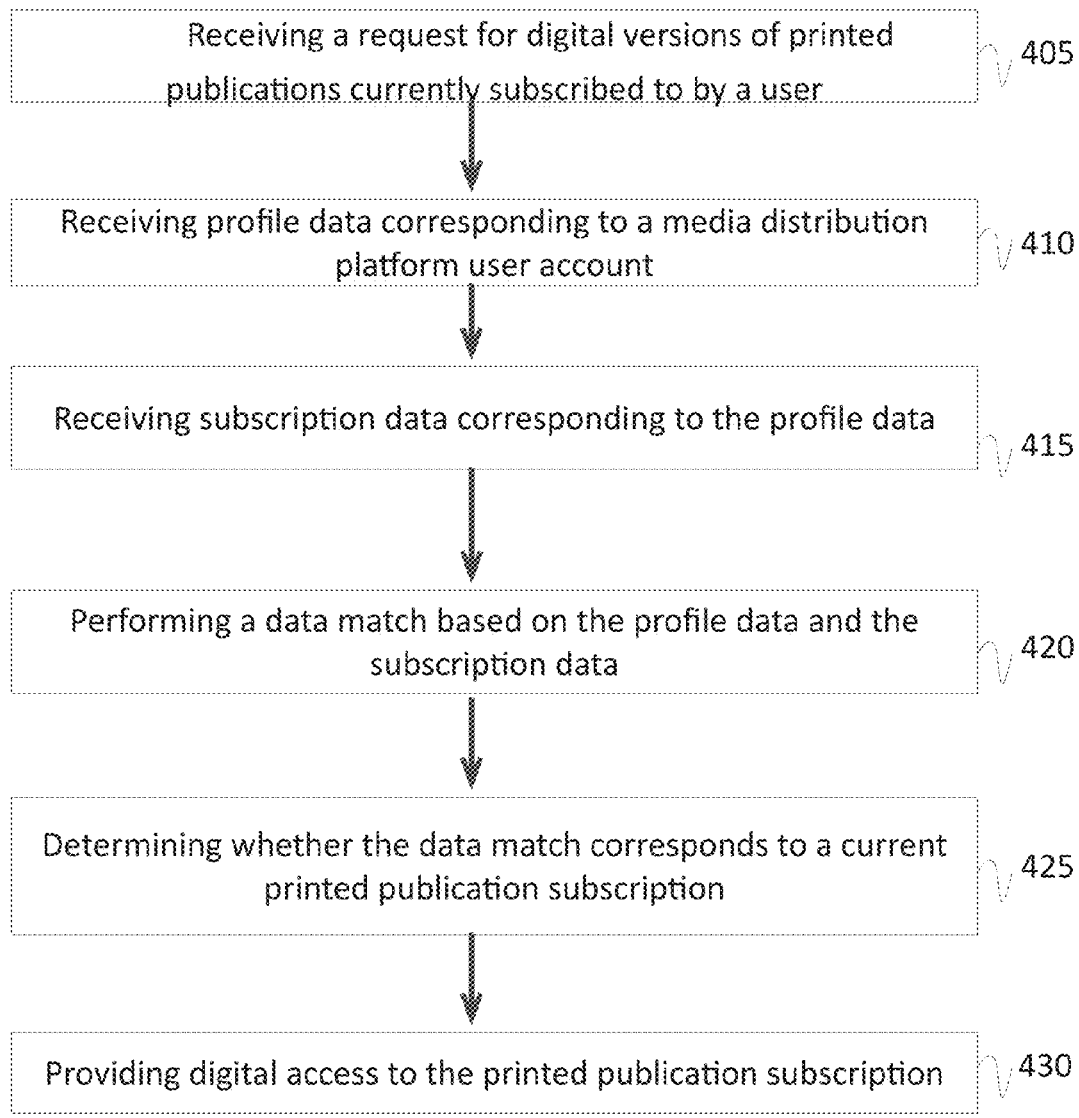
FIG. 4 illustrates a method of automatically providing access to digital versions of non-digital media a user subscribes to where the subscription data is available to the media distribution platform.

FIG. 4 illustrates a method of automatically providing access to digital versions of non-digital media a user subscribes to where the subscription data is available to the media distribution platform. In this scenario, publishers have provided their subscription data to a media distribution platform to allow for the authentication of a user's subscription to occur within the media distribution platform. As shown, the method begins at block 405 where a request is received for digital versions of non-digital media subscribed to by a user. In some embodiments a user subscribes to a plurality of publications from a plurality of publishers. The request for digital versions of non-digital media can involve one or more publications from a plurality of publishers. Additionally, the request for digital versions can occur as one input into a media distribution platform i.e. a click of a mouse, an input on a touch screen of a graphical user interface of a mobile device, etc.

Upon receiving the request for digital versions, the method continues to block 410 where user profile data corresponding to a media distribution platform user account is received. The user profile data can include identification information. Some non-limiting examples of identification information are the user's name, maiden name, home addresses, business addresses, mailing addresses, email addresses, date of birth, etc.

The method continues to block 415 where subscription data is received which corresponds to the user profile data. In some embodiments, the subscription data can originate from a clearinghouse database containing a large majority of subscription data for multiple third-party subscribers of a plurality of publishers. In other embodiments the subscription data can originate from an API publishers use to provide subscription data to the media distribution platform server or the Content Server. Some non-limiting examples of subscription data are the subscriber's name, maiden name, home addresses, business addresses, mailing addresses, email addresses, date of birth, etc.

Once the user profile data and subscription data are received the method continues to block 420 where a data match is performed based on the user profile data and the subscription data. In some embodiments the subscription data and identification information are received at the media distribution platform and the data match occurs at the media distribution platform server. In other embodiments the subscription data and identification information are received at the Content Server and the data match occurs at the Content Server. In either scenario, the data match determines whether the user profile data and subscription data refer to the same individual.

The method continues to block 425 where it is determined whether the data match corresponds to a current non-digital media subscription. In some embodiments the subscription data utilized to perform the data match may correspond to an expired or cancelled subscription. Therefore, determining whether or not the subscription data corresponds to a current subscription is critical step before providing digital versions of non-digital media to the media distribution platform server or the Content Server.

Where the data match corresponds to a current non-digital media subscription, the method continues to step 430 where digital access to the non-digital media subscription is provided to the media distribution platform server or the Content Server. In some embodiments digital versions of the non-digital media subscription can be accessed on the media distribution server or a user's client device.

Figure 5:
FIG. 5 illustrates a method of automatically providing access to digital versions of non-digital media a user subscribes to where the subscription data is private.

FIG. 5 illustrates a method of automatically providing access to digital versions of non-digital media a user subscribes to where the subscription data is private. In this scenario, publishers have elected to not provide their subscription data to a media distribution platform precluding authentication of a user's subscription from occurring within the media distribution platform server. Rather, the authentication can occur directly at the third-party publisher's server.

As shown, the method begins at block 505 where a request is received for digital versions of non-digital media subscribed to by a user. In some embodiments a user subscribes to a plurality of publications from a plurality of publishers. The request for digital versions of non-digital media can involve one or more publications from a plurality of publishers. Additionally, the request for digital versions can occur as one input into a media distribution platform, i.e., a click of a mouse, an input on a touch screen of a graphical user interface of a mobile device, etc.

The method continues to block 510 where user profile data corresponding to a media distribution platform user account is received. The user profile data can include identification information. Some non-limiting examples of identification information are the user's name, maiden name, home addresses, business addresses, mailing addresses, email addresses, date of birth, etc.

Upon receipt of the user profile data, the method continues to block 515 where the user profile data received is sent to a third-party publisher to authenticate subscription to a non-digital media. In some embodiments, the portions of user profile data required to authenticate the subscriptions vary by publisher. The media distribution platform can determine which user profile data is required by the publisher, select the applicable portions of the user profile data and send those portions to authenticate the subscription.

Provided the Publisher recognizes the user profile data sent, the method continues to step 520 where an access token for a non-digital media subscription is received from the Publisher. In some embodiments, the access token for a given subscription will be included whenever the user receives digital content relating to the subscription from the publisher. This enables the publisher to refuse the access token whenever the subscription is expired or cancelled. In some embodiments, one access token is provided to a user for each subscription authenticated from the Publisher. For example, if five publications are authenticated from Publisher, five access tokens are provided. In other embodiments, one universal access token is provided to a user for all the subscriptions authenticated from the Publisher. For example, if five publications are authenticated from the Publisher, one universal access token is provided. In some embodiments the access token is received by the media distribution platform server. In other embodiments the access token is received by the client device.

The method continues to block 525 where the digital access to the non-digital media subscription is requested from the Publisher including the access token. In some embodiments, a request is a request is sent to the Publisher from the media distribution platform server or the client device. The access token can accompany the request to enable the Publisher to identify the subscription requested and determine whether or not the subscription is current, expired, or cancelled.

Where the access token is successfully verified by the Publisher, the method continues to step 530 where digital access to the non-digital media subscription is provided to the media distribution platform server or the Content Server. In some embodiments digital versions of the non-digital media subscription can be accessed on the media distribution server or a user's client device.

Figure 6:
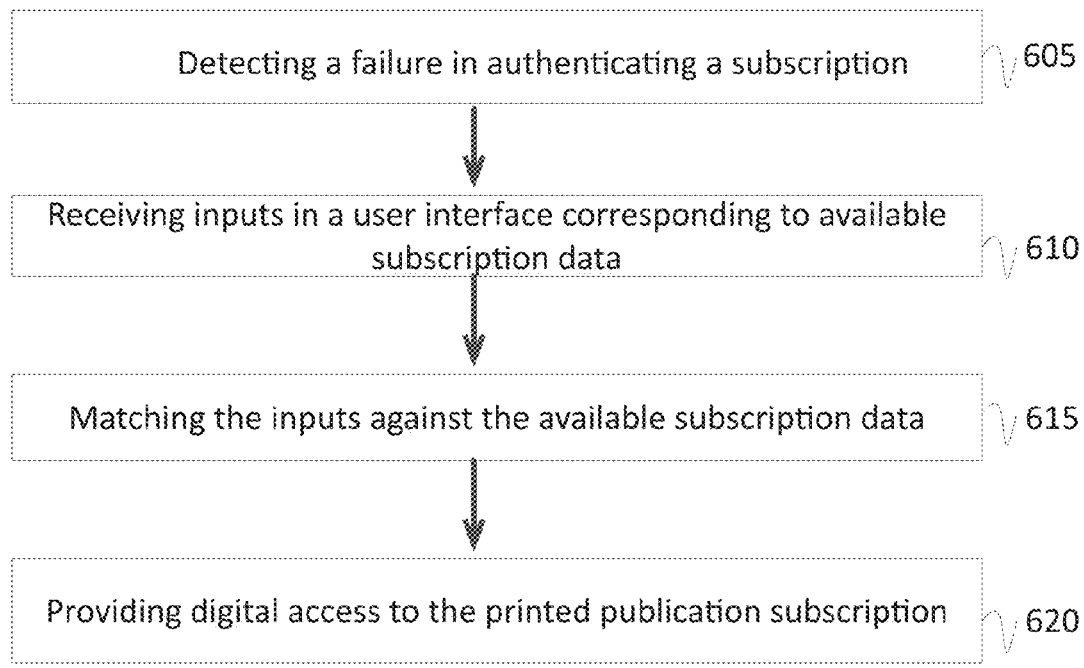
FIG. 6 illustrates a method of providing digital access to non-digital media subscribed to by a user where the subscription data is available to the media distribution platform.

FIG. 6 illustrates a method of providing access to digital versions of non-digital media a user subscribes to where the subscription data is available to the media distribution platform. In FIG. 6 a failure in authenticating a subscription has occurred requiring manual user input by a user. In these failure cases additional information can be manually required from a user to authenticate a user's subscription. In some embodiments, a user interface will appear on a client device requesting fields a user needs to populate to authenticate the user's subscription to publications. Where subscription data is available to the media distribution platform, the user input received at the client device can be matched up against the subscription data, and if the input is recognized, the user will be granted a subscription to digital content.

As shown, the method begins at block 605 where a failure has occurred in authenticating a subscription to a publication. Despite the fact that the user may indeed be subscribed to the publication, the authentication might fail for multiple reasons. Some non-limiting examples of scenarios in which authentication might fail for a subscriber include: the user has multiple billing addresses and did not use the same address with the media distribution platform server that they used with the Publisher; there are multiple subscribers at a single address; the user is not a subscriber; the publisher has poor address recognition; etc.

The method continues to block 610 where inputs in a user interface corresponding to the subscription data available is received. In some embodiments, the subscription data available will dictate which input fields are presented to the user. Some non-limiting examples of input fields presented to the user are: mailing address, subscription account number, email address, subscriber's name, maiden name, home addresses, business addresses, mailing addresses, email addresses, date of birth, username and password, etc.

Upon receipt of the inputs, the method continues to block 615 where the inputs received are matched against the subscription data available. In some embodiments, the subscription data can be stored at the media distribution platform server. In other embodiments the subscription data can be stored at the Content Server. In some instances the data matching can occur on the media distribution platform or the Content Server.

Where the matching of inputs received against available subscription data is successful, the method continues to step 620 where digital access to the non-digital media subscription is provided to the media distribution platform server or the Content Server. In some embodiments digital versions of the non-digital media subscription can be accessed on the media distribution server or a user's client device.

Figure 7:
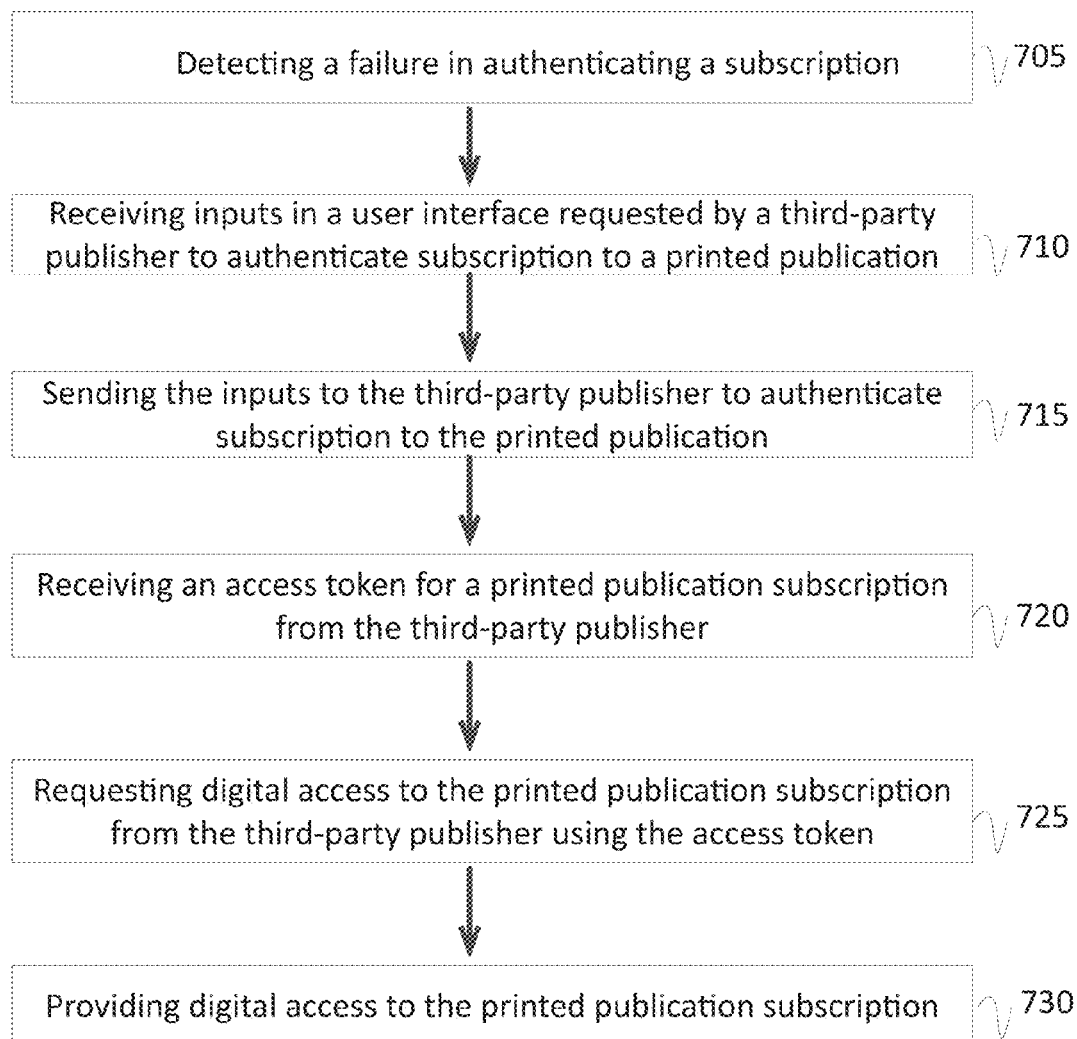
FIG. 7 illustrates a method of providing access to digital versions of non-digital media a user subscribes to where the subscription data is private.

FIG. 7 illustrates a method of providing access to digital versions of non-digital media a user subscribes to where the subscription data is private. In FIG. 7 a failure in authenticating a subscription has occurred requiring manual user input by a user. In these failure cases additional information can be manually required from a user to authenticate a user's subscription. In some embodiments, a user interface will appear on a client device requesting fields a user needs to populate to authenticate the user's subscription to publications. Where subscription data is private, the user input received at the client device can be matched up against the subscription data, and if the input is recognized, the user will be granted a subscription to digital content.

As shown, the method begins at block 705 where a failure has occurred in authenticating a subscription to a publication. Despite the fact that the user may indeed be subscribed to the publication, the authentication might fail for multiple reasons. Some non-limiting examples of scenarios in which authentication might fail for a subscriber include: the user has multiple billing addresses and did not use the same address with the media distribution platform server that they used with the Publisher; there are multiple subscribers at a single address; the user is not a subscriber; the publisher has poor address recognition; etc.

The method continues to block 710 where inputs in a user interface requested by a publisher to authenticate a subscription are received. In some embodiments, the Publisher dictates which fields are presented to the user. Some non-limiting examples of input fields presented to the user are: mailing address, subscription account number, email address, subscriber's name, maiden name, home addresses, business addresses, mailing addresses, email addresses, date of birth, username and password, etc.

Upon receipt of the inputs, the method continues to block 715 where the inputs received are sent to the Publisher to authenticate the subscription. Provided that the publisher recognizes the user inputs and is able to authenticate the subscription associated with the user inputs, the method continues to block 720 where an access token for a subscription is received from the Publisher for the given subscription. In some embodiments, the access token for a given subscription will be included whenever the user receives digital content relating to the subscription from the publisher. This enables the publisher to refuse the access token whenever the subscription is expired or cancelled. In some embodiments the access token can be received at the client device. In other embodiments the access token can be received at the media distribution platform server or the Content Server.

The method continues to block 725 where digital access to the non-digital media subscription from the publisher using the access token is requested. In some embodiments a request for digital access can be sent to the publisher including the access token. Thereafter, the publisher can verify that the access token is not expired or cancelled. Provided that the access token is verified as relating to a current subscription, the method continues to block 730 where digital access to the non-digital media subscription is provided to the media distribution platform server or the Content Server. In some embodiments digital versions of the non-digital media subscription can be accessed on the media distribution server or a user's client device.

Figure 8:
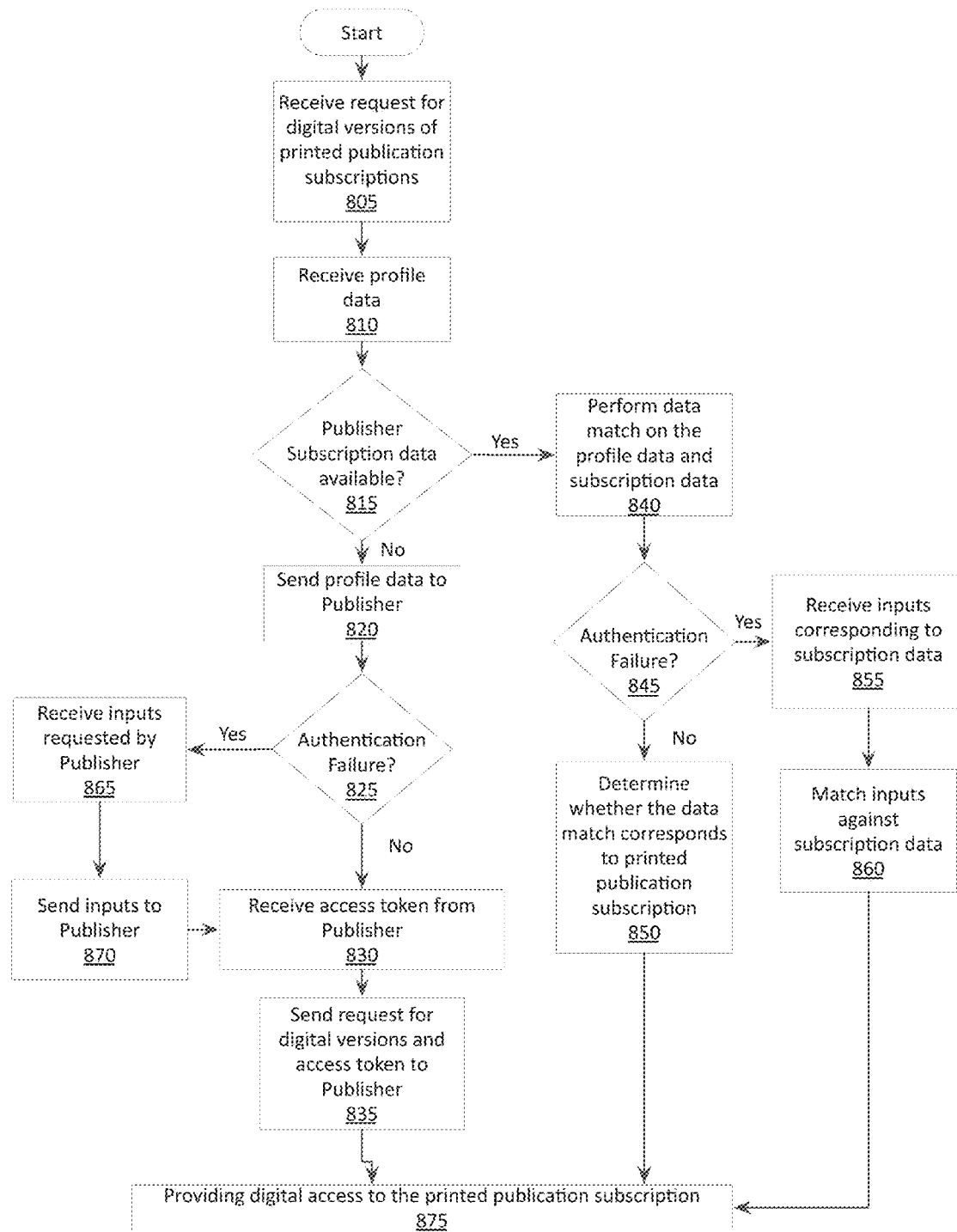
FIG. 8 illustrates an example flowchart of how a user's subscription to a non-digital media is authenticated and how digital versions of the non-digital media are a provided.

FIG. 8 illustrates an example flowchart of how a user's subscription to a non-digital media is authenticated and how digital versions of the non-digital media are a provided. The flowchart begins at step 805 where a request for digital versions of non-digital media subscriptions is received. The flowchart continues to step 810 where user profile data is received corresponding to a media distribution platform user account. At step 815, if the Publisher has shared subscription data with the media distribution platform the flowchart continues to step 840 where a data match is performed on the user profile data and subscription data. The flowchart continues to step 845 which determines whether authentication of the user's subscription to a non-digital media failed. If the authentication was successful the flowchart continues to step 850 where one or more non-digital media offered by the Publisher are determined to be associated with the subscriber identified in the successful data match. The flowchart continues to step 875 where digital versions of the non-digital media subscriptions are provided to the user.

Returning to step 845 where authentication of the subscriber has failed in the data match, the flowchart continues to step 855 where manual user inputs are received in a user interface. In some embodiments the manual user inputs required are fields consistent with the subscription data available. The flowchart continues to step 860 where the manual user inputs are matched against the subscription data available. Provided that a successful data match occurs at step 860, the flowchart continues to step 875 where digital versions of the non-digital media subscriptions are provided to the subscriber.

Returning to step 815, if the Publisher has not chosen to share subscription data the flowchart continues to step 820 where the user profile data received is automatically sent directly to the Publisher absent any user input. The flowchart continues at step 825 where authentication of a user subscription associated with the user profile data is determined. Provided that the Publisher recognizes the user profile data received and authentication of the users subscription to non-digital media was successful, the flowchart continues to step 830 where an access token is received from the Publisher. If an authentication of a user's subscription to non-digital media fails at step 825 the flowchart continues to step 865 where a user manually provides inputs into a user interface requested by the publisher. The flowchart continues to step 870 where the input manually provided by the user are sent to the Publisher to authenticate the user's subscription to non-digital media materials.

In either scenario following step 825 where authentication was automatically successful or required manual user inputs to authenticate the users subscription, the flowchart continues to step 830 where an access token is received from the Publisher. The flowchart continues to 835 where a request for digital versions of the non-digital media authenticated and the access token is sent to the Publisher. The flowchart continues to step 875 where digital versions of the non-digital media subscriptions are provided to the user.

Figure 9B:
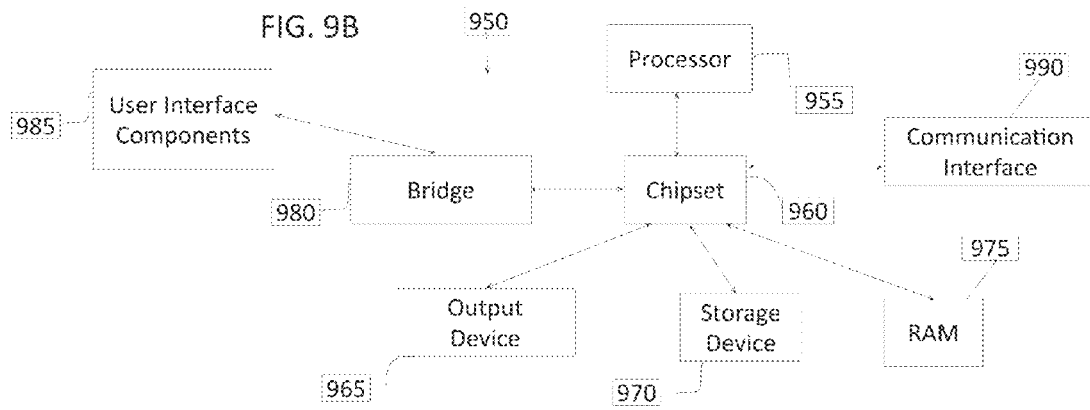
FIG. 9B illustrates a computer system having a chipset architecture according to some embodiments of the present technology.
Figure 9A:
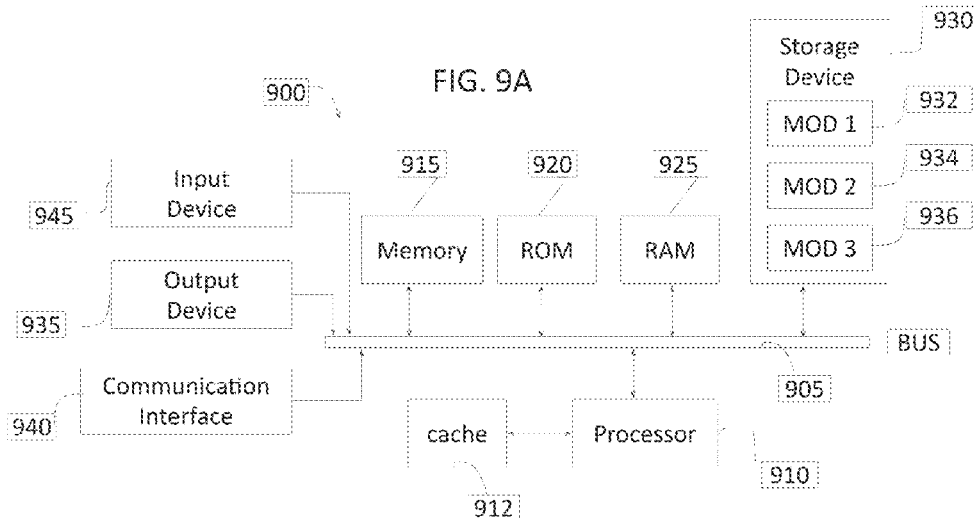
FIG. 9A illustrates a conventional bus computing system architecture according to some embodiments of the present technology.

FIG. 9A, and FIG. 9B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 9A illustrates a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 can essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here can easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B illustrates a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that exemplary systems 900 and 950 can have more than one processor 910 or be part of a group or cluster of computing devices networked together to provide greater processing capability.

For clarity of explanation, in some instances the present technology can be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A method comprising:
receiving, at a media distribution platform, a request for digital versions of non-digital media currently subscribed to by a user;
obtaining profile data corresponding to a media distribution platform user account identifying the user, the profile data stored in a database maintained at the media distribution platform;
receiving subscription data from a clearinghouse database containing non-digital media subscription data for a third-party publisher;
transmitting the profile data to the clearinghouse database, the clearinghouse database including records of subscribers to non-digital media;
matching the profile data with the subscription data; and
upon a successful match, providing a digital version of the non-digital media subscribed to by the user on the media distribution platform, after receiving an access token for access to the non-digital media subscription data from the third-party publisher, based on the access token.

2. The method of claim 1, wherein the matching occurs within the media distribution platform.

3. The method of claim 1 further comprising:
signing into the media distribution platform with a user login and password; and
receiving one input into the media distribution platform to request the digital versions of non-digital media currently subscribed to by the user.

4. The method of claim 3, wherein the one input into the media distribution platform is an input on a touch screen of a graphical user interface of a mobile device.

5. The method of claim 1 further comprising:
refreshing digital versions of non-digital media available upon a user logging into the media distribution platform.

6. The method of claim 1 further comprising:
providing digital versions of a plurality of non-digital media subscriptions offered by a single third-party publisher on the media distribution platform.

7. The method of claim 1 further comprising:
receiving a notification that authentication of a subscription to a non-digital media has failed;
receiving inputs into a user interface on a media distribution platform, the input consisting of fields corresponding to the subscription data available on the media distribution platform;

performing a data match between the inputs and the subscription data;

determining whether the data match corresponds to a current non-digital media subscription; and providing digital versions of the non-digital media subscription on the media distribution platform.

8. A non-transitory computer-readable storage medium having stored therein instructions which, when executed by a processor, cause the processor to perform operations comprising:

receive, at a media distribution platform, a request for digital versions of non-digital media currently subscribed to by a user;

obtain profile data corresponding to a media distribution platform user account identifying the user, the profile data stored in a database maintained at the media distribution platform;

receive subscription data corresponding to the profile data from a clearinghouse database containing subscription data for a third-party publisher;

transmit the profile data to the clearinghouse database, the clearinghouse database including records of subscribers to non-digital media;

perform a data match based on the profile data and the subscription data;

determine whether the data match corresponds to a non-digital media subscription; and upon a successful match, provide digital versions of the non-digital media subscribed to by the user on the media distribution platform, after receiving an access token for access to the non-digital media subscription data from the third-party publisher, based on the access token.

9. The non-transitory computer-readable storage medium of claim 8, wherein the instructions further causer the processor to:

sign into the media distribution platform with a user login and password; and receive one input into the media distribution platform to request the digital versions of non-digital media currently subscribed to by the user.

10. The non-transitory computer-readable storage medium of claim 9, wherein the one input into the media distribution platform is an input on a touch screen of a graphical user interface of a mobile device.

11. The non-transitory computer-readable storage medium of claim 8, wherein the instructions further causer the processor to:

refresh digital versions of non-digital media available upon a user logging into the media distribution platform.

12. The non-transitory computer-readable storage medium of claim 8, wherein the instructions further causer the processor to:

provide digital versions of a plurality of non-digital media subscriptions offered by a single third-party publisher on the media distribution platform.

13. The non-transitory computer-readable storage medium of claim 8, wherein the instructions further causer the processor to:

receive a notification that authentication of a subscription to a non-digital media has failed;

receive inputs into a user interface on a media distribution platform, the input consisting of fields corresponding to the subscription data available on the media distribution platform;

perform a data match between the inputs and the subscription data;

determine whether the data match corresponds to a current non-digital media subscription; and provide digital versions of the non-digital media subscription on the media distribution platform.

14. A method comprising:

receiving, at a media distribution platform, a request for digital versions of non-digital media currently subscribed to by a user;

obtaining profile data corresponding to a media distribution platform user account corresponding to the user, the profile data stored in a database maintained at the media distribution platform;

receiving subscription data from a clearinghouse database containing non-digital media subscription data for a third-party publisher;

matching the profile data with the subscription data after transmitting the profile data to the clearinghouse database; and upon a successful match, providing a digital version of the non-digital media subscribed to by the user on the media distribution platform, after receiving an access token for access to the non-digital media subscription data from the third-party publisher, based on the access token.

* * * * *